Sept. 1, 1959

R. C. LANGFORD ET AL 2,902,648

MARKER SIGNAL GENERATOR

Filed Oct. 18, 1954

ROBERT C. LANGFORD and
ERWIN STUART DAVIS
INVENTORS

BY
Rudolph J. Jurick
ATTORNEY

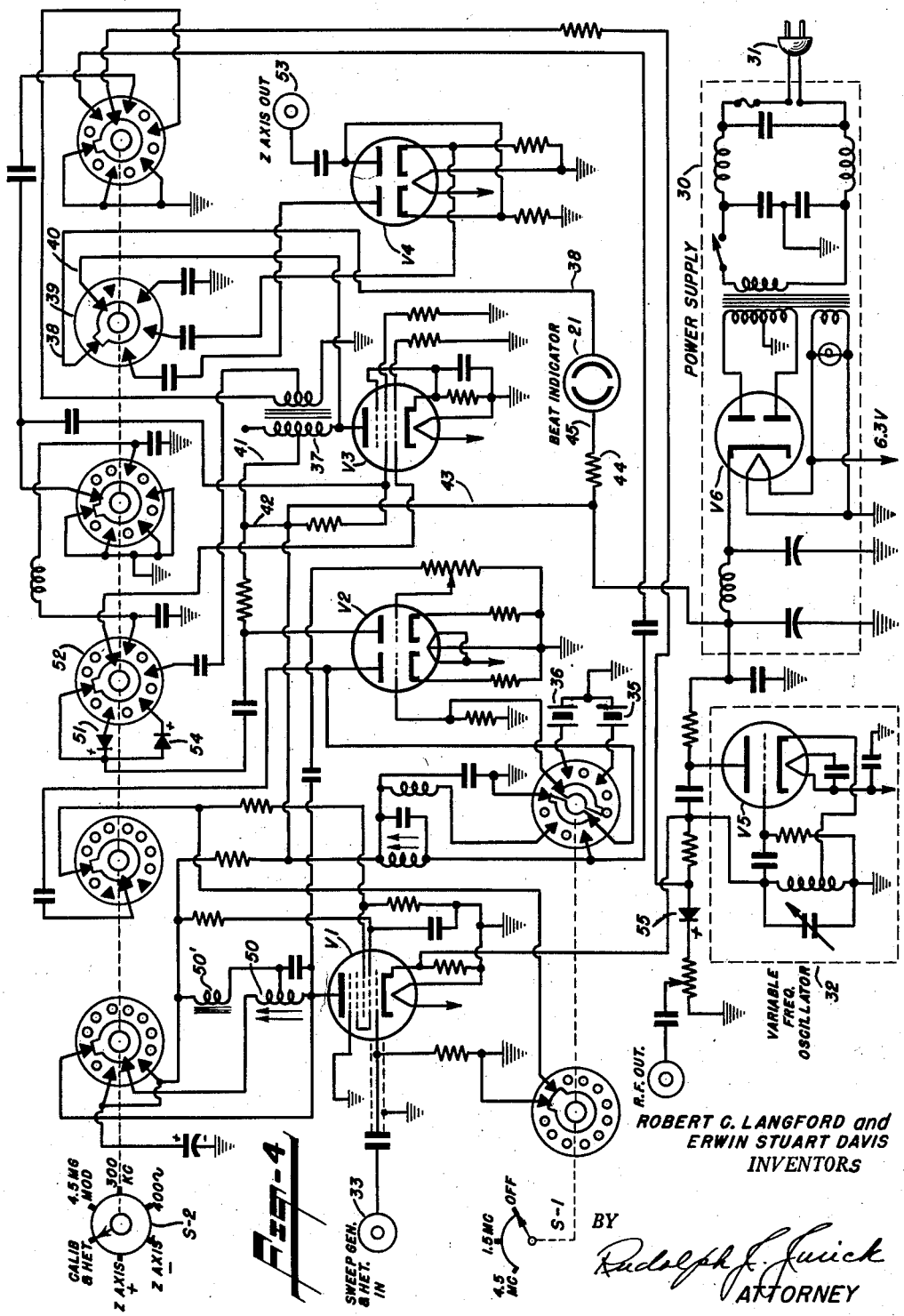

United States Patent Office 2,902,648
Patented Sept. 1, 1959

2,902,648

MARKER SIGNAL GENERATOR

Robert C. Langford, Elizabeth, and Erwin Stuart Davis, Newark, N.J., assignors, by mesne assignments, to Daystrom, Incorporated, Murray Hill, N.J., a corporation of New Jersey Application October 18, 1954, Serial No. 462,928

5 Claims. (Cl. 324—79)

This invention relates to improvements in electronic frequency calibrating devices of the class used to obtain on an oscilloscope screen the response curve of an electronic circuit and more particularly to a novel arrangement for checking the frequency of a variable frequency oscillator forming part of a marker signal generator, said arrangement including means providing a visual indication of the fundamental beat frequency of two oscillator signals to the exclusion of spurious beats and other low frequency noises.

In a co-pending United States patent application, Serial No. 457,014, filed September 20, 1954, now Patent No. 2,859,348, in the names of Robert C. Langford and Frederich W. Sippach, Jr., and entitled Method and Apparatus for Testing Electronic Circuits and Components, there is disclosed a novel visual alignment method and apparatus having numerous practical advantages lacking in comparable methods and apparatus heretofore proposed. The referenced co-pending application discloses a visual alignment procedure particularly adapted for obtaining the complete response curve of a television receiver on the screen of a cathode ray oscilloscope. Briefly, a portion of a frequency modulated sweep generator signal is applied to the TV receiver input and the resulting receiver output signal is applied to the vertical beam-deflecting plates of the oscilloscope. The signal of a calibrated, variable frequency oscillator and another portion of the sweep generator signal are applied to a mixer circuit to produce a modulated signal having an envelope frequency that is the sum and difference of the two signals. Such resulting signal is demodulated, further amplified, if necessary, and clamped to ground, and the clamped signal is applied to the Z-axis of the oscilloscope. By so modulating the intensity of the oscilloscope electron beam, precise, clearly visible markers are displayed on the oscilloscope screen at a frequency point corresponding to that where the sweep generator frequency crosses that of the variable oscillator signal.

While the direct Z-axis modulation system disclosed in the referenced co-pending patent application has many advantages it is here pertinent to point out only that the modulated sweep generator and calibrator oscillator signals are applied directly to the intensity control element of the oscilloscope electron beam whereby the markers on the screen are visible even when the circuits under test have a very low, in fact zero, response to the sweep generator signal. Consequently, the method allows for the accurate setting of trap circuits and the bandwidth settings of very narrow bandpass circuits.

In order to display adequately the response curve of a TV receiver the sweep generator should have an output whose center frequency is equal to the center frequency of the response curve being observed and whose minimum and maximum frequency deviation is more than sufficient to cover the adjacent sound and picture carriers of the circuits under test. With a response curve of the receiver displayed on the oscilloscope screen it is necessary to be able to identify the specific frequency points on the curve. This is done by reference to a calibrated dial forming a part of the variable frequency oscillator such dial having associated therewith a pointer that is movable in accordance with a manual adjustment of the oscillator tank circuit constants. In practice, the variable frequency oscillator, the mixer circuit and the associated demodulator, amplifier and clamping circuit are referred to as a calibrator or marker generator.

Among the problems encountered in the design of a good marker signal generator for testing TV receivers is the vital need to provide accurate means for indicating the true beats of the sweep generator signal and the variable oscillator signal to the exclusion of spurious indications. The problem is rendered more difficult and costly of solution in apparatus which must cover a wide frequency range. It is particularly troublesome in the case of a frequency modulated generator where the swept output may pass through a series of spurious response points. Customary methods for removing the spurious signals, such as the use of bandpass filters, traps, etc., are impractical in a marker generator which may cover a range of frequencies extending from the audio through the very high frequency region.

An object of this invention is the provision of apparatus useful for checking the frequency calibration of a marker signal generator and, when necessary, adjusting such calibration to a precise, predetermined reference frequency.

An object of this invention is the provision of a marker signal generator which includes means providing a visual indication only of the fundamental beats between an incorporated variable frequency oscillator and a crystal controlled oscillator, for the purpose of standardizing the variable frequency oscillator signal.

An object of this invention is the provision of a marker signal generator comprising a variable frequency oscillator including means to selectively vary the oscillation frequency, a crystal controlled oscillator, a mixer circuit for combining the signals from the two oscillators to produce a modulated signal that has a frequency equal to the sum and difference of the said oscillator signals, means to demodulate the modulated signal, and visual indication means responsive only to demodulated signals having a predetermined minimum amplitude.

An object of this invention is the provision of a marker signal generator including visual indicating means responsive only to the generator output signals having a predetermined minimum amplitude, said means comprising a voltage-biased gas tube.

An object of this invention is the provision of a marker signal generator comprising a variable frequency oscillator including calibrated means to selectively vary the oscillation frequency, a crystal controlled oscillator, a mixer circuit combining the signals of the two oscillators and producing resultant modulated signals, means demodulating the resultant signals, an amplifier responsive to said demodulated signals, means clamping the amplified signals to a zero voltage reference basis, and a gas-tube energized by the output stage of said amplifier and arranged to provide an indication only of the true beats between the signals fed to the mixer circuit.

These and other objects and advantages of the invention will become apparent from the following description when taken with the accompanying drawings. It will be understood the drawings are for purposes of illustration and are not to be construed as defining the scope or limits of the invention, reference being had for the latter purpose to the claims appended hereto.

In the drawings wherein like reference characters denote like parts in the several views:

Figure 4 is a wiring diagram of apparatus made in accordance with this invention.

Figure 1:
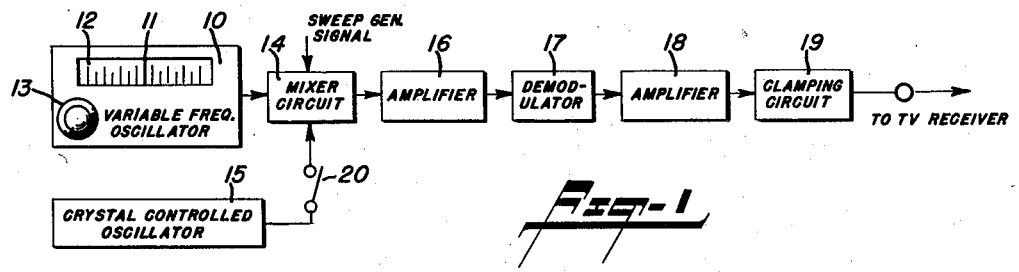
Figure 1 is a block diagram showing the major components of a conventional marker signal generator.

Reference is now made to the block diagram of Figure 1 which shows a conventional calibrator or marker signal generator. The variable frequency oscillator 10 includes a pointer 11 movable over a graduated scale 12 in response to rotation of the knob 13. Rotation of the knob 13 alters the constants of the oscillator tank circuit in any of several specific ways known in the art. The signal from the oscillator 10 is injected into the mixer circuit 14 along with an accompanying signal from a conventional frequency modulated sweep generator thereby resulting in a large number of intermodulation products. The sweep generator signal starts at a low frequency and as it increases in frequency the numerical difference between the sweep frequency and the variable oscillator frequency decreases. At a point known as "zero beat" the two frequencies are equal. As the sweep generator signal continues to increase in frequency the numerical difference between these two frequencies increases. If the plate load in the mixer circuit is tuned to 75 kilocycles there will be two points at which the mixer circuit will generate an output. One such point will be 75 kilocycles below the setting of the variable frequency oscillator and the other will be 75 kilocycles above such setting. These 75 kilocycle signals are amplified by the amplifier 16 and rectified by the demodulator 17. Such rectified signals are further amplified by the amplifier 18 and clamped to ground level by the clamping circuit 19. If the crystal controlled oscillator 15 is connected to the mixer circuit by closure of the switch 20 its signal produces side bands on the variable oscillator frequency. For example, if the variable oscillator is set to 100 megacycles and the crystal controlled oscillator at 4.5 megacycles, then three signals at 95.5 megacycles, 100 megacycles and 104.5 megacycles will be present in the mixer circuit output. These various output signals of the marker signal generator are, in accordance with conventional practice, applied to the beam-deflecting plates of an oscilloscope after passing through the circuit under test as, for example, a TV receiver. The marker points generated on the response curve of the receiver, as displayed on the oscilloscope screen, are generally referred to as marker pips.

Figure 2:
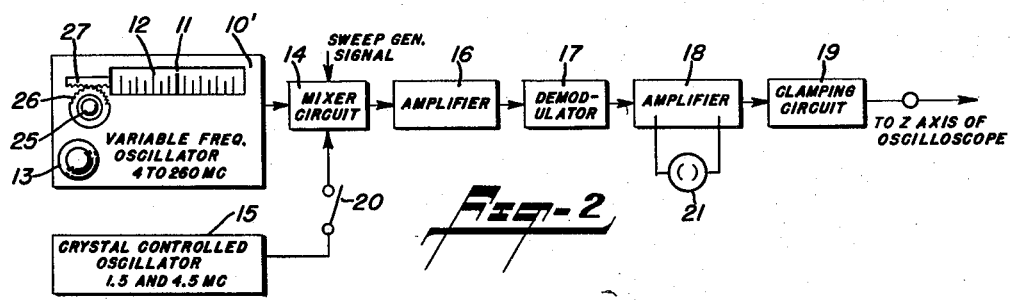
Figure 2 is a similar showing of a marker signal generator made in accordance with this invention.
Figure 3:
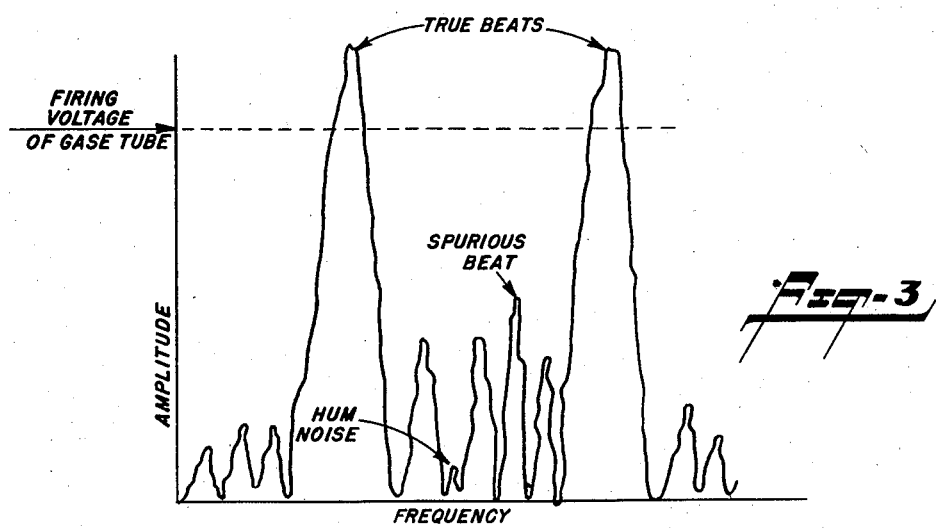
Figure 3 is a curve showing the response of the gas tube used to indicate only the true beat frequencies of the signals applied to the mixer.

Reference is now made to Figure 2 which is a block diagram of a marker signal generator including the improvements of this invention. Production of low frequencies is inherent in any frequency modulated system which passes through zero beat and these low frequencies tend to obscure the true beat frequency. One feature of our invention is the provision of means for accurately establishing the frequency of the variable frequency oscillator such means providing a visual indication of the true beats between the variable frequency oscillator and the built-in crystal controlled calibrator oscillator. The novel means consists of a gas tube 21 connected into the output stage of the amplifier 18. The crystal controlled oscillator produces an output that is rich in harmonics of the fundamental frequency of the crystal and it is desired to compare a selected such harmonic frequency with that of the variable frequency oscillator. The function of the gas tube 21 is to distinguish such selected harmonic frequency from all spurious frequencies which have voltages under the selective threshold or firing voltage of the gas tube. Thus, the true frequency of the variable frequency oscillator can be correctly determined at all harmonics of the crystal oscillator to the accuracy with which the crystal was ground. Although a more detailed description of circuit of our improved marker signal generator is given hereinbelow with specific reference to Figure 4, attention is now directed to Figure 3 which illustrates the functional operation of the gas tube. The various modulated signals passing from the demodulator 17 to the amplifier 18, Figure 2, are shown and identified on a representative basis in Figure 3. All hum noises and spurious beats which have a voltage amplitude below the firing voltage of the gas tube will not cause the tube to fire or glow. By properly connecting the gas tube into the circuit and by properly adjusting the amplitude of the signals to which the tube is responsive, the tube will glow only in response to the selected true beat signals thereby providing a visual indication solely of the true beats.

Reference is again made to Figure 2 for a description of another feature of our invention. Since even the best oscillator circuits are subject to minor scale errors, it is desirable to provide some means for periodically correcting the indication of the pointer 11 relative to the calibrated scale 12. The scale 12 is of the conventional slide rule type. Specifically, numerous scale bands, each having a predetermined range of frequency graduations, are arranged longitudinally along the surface of a rotatable drum. Such drum is controlled by a suitable mechanical coupling arrangement whereby rotation of the knob 13 automatically presents to the pointer 11 that scale having the proper frequency range of the so-adjusted oscillator circuit frequency. In our marker signal generator the calibration of each such frequency range is checked against the crystal controlled oscillator providing signals 1.5 and 4.5 megacycles apart throughout the entire frequency range of the variable frequency oscillator 10′. In the event the pointer 11 is not in precise alignment with the scale calibration corresponding to the frequency of the crystal checking oscillator the entire scale drum can be shifted axially by rotation of a knob 25 having secured thereto a gear 26 cooperating with a gear rack 27 that is attached to the drum. The gas tube 21 is utilized to visibly indicate the specific frequency of the crystal controlled signal. For example, the 10th harmonic of a 4.5 megacycle crystal is 45 megacycles having the same basic crystal accuracy of .01%. If the pointer 11 is not aligned with the 45 megacycle point on the scale 12, then the scale shift knob 25 is rotated until the pointer and such scale mark coincides. This provides precise calibration in 4.5 megacycle steps. For finer calibration steps a 1.5 megacycle crystal can be used.

Reference is now made to Figure 4 which is a circuit diagram of a marker signal generator incorporating the improvements of this invention. Power for energizing the various components is obtained from a conventional power supply 30 adapted to be connected to a 60 cycle power line by means of the connector plug 31. The mixer circuit includes the vacuum tube V1, which may be a type 6BA7, having its control grid connected to input terminal 33. The variable frequency oscillator 32 includes the type 6T4 tube V5. Since numerous conventional methods for selectively adjusting the oscillator tank circuit to produce oscillations of a desired frequency may be used and since a specific such arrangement forms no part of the present invention, the variable frequency oscillator circuitry is shown only more or less as a functional representation. For purposes of description, it is deemed sufficient to point out that the output signal of the variable frequency oscillator is applied to the cathode of the mixer tube V1. The crystal controlled oscillator includes the left half of the vacuum tube V2, type 12AT7, and the crystals 35, 36 having fundamental frequencies of 1.5 and 4.5 megacycles, respectively. The selection of one or the other of the crystals and the application of the resulting oscillatory signal into the mixer tube is controlled by a two deck rotary switch S–1 provided with an index pointer. In the illustrated setting of the switch S–1 the crystal oscillator is inoperative. However, rotation of the switch to the 1.5 megacycle or 4.5 megacycle index position connects the corresponding crystal to the left control grid of the tube V2 thereby completing the oscillation circuit. It may here be pointed out that a six deck, rotary switch S-2, also provided with an index pointer, permits a selective adjustment of the various circuits for numerous specific purposes which will be explained as the description proceeds. When the switch S-2 is set in the illustrated position the left plate of the tube V2 is connected to the second control grid of the mixer tube V1 thereby injecting the crystal oscillator signal into the mixer circuit.

The modulation products of the signals applied to the mixer tube are amplified by the right-hand section of the tube V2 and (after demodulation by one of the diodes 51 and 54) the amplifier tube V3, which may be a type 6CL6, and then clamped to ground by the diode tube V4, the latter also damping the inductive load of the V3 amplifier stage.

The six deck, rotary gang switch S-2 is illustrated in the position wherein the apparatus is conditioned for checking the calibration of the variable frequency oscillator or for determining the frequency of an unknown signal. Accordingly, the index pointer of the switch is alined with the reference marking Calib. & Het. It will be noted that in this position of the switch S-2 the beat indicator or gas tube 21 is connected across the coil 37 in the plate output circuit of the amplifier tube V3, the circuit being traceable as follows: the right electrode of the gas tube 21, lead 38, the now-closed contacts of deck 39 (of the switch S-2), lead 40, plate coil 37, leads 41, 42, 43, current limiting resistor 44 and lead 45 that is connected to the left electrode of the gas tube. As explained with reference to Figure 3, the tube 21 has a minimum firing voltage (which in the case of a neon tube is about 60 volts) and, consequently, the tube will glow only when signals having a voltage amplitude exceeding the firing voltage are impressed across the electrodes. The amplitude of the signals appearing in the plate coil 37, and, consequently, across the gas tube, can be varied by adjusting the gain of one or both of the amplifiers V2, V3. Since noise, spurious signals and low frequency noise components have a generally lower amplitude than the desired fundamental marker signals it is only necessary to adjust the striking level of the gas tube circuit above the maximum voltages generated by the unwanted signals. The gas tube can be given an appropriate D.-C. bias potential when this is required to permit selection of the signal amplitude difference as small as 10 volts.

Assuming that an unknown signal is applied to the apparatus input terminal 33 this signal is injected directly into the mixer circuit. The variable frequency oscillator, which is at all times connected to the mixer circuit, is then adjusted until a zero beat is obtained as indicated by the gas tube 21. In this case, the plate load coil 50', of the mixer tube, is not tuned and responds to very low audio frequencies. The amplitude of the mixer output signals is adjusted so that the gas tube will light up when the difference frequency between the unknown signal and the variable frequency oscillator signal is some very small value. All other spurious signals will, then, have an amplitude falling below the firing voltage of the gas tube. Since these difference frequency signals will exist to either side of the unknown signal frequency, the variation of the frequency of the variable frequency oscillator up to and beyond the frequency of the unknown signal will result in a lighting up of the gas tube, then its sharp extinction and then again by a lighting up thereof. Hence, the exact zero beat point is readily established by gradual rotation of the frequency control knob 13 of the variable frequency oscillator and at such point the precise frequency of the unknown signal may be read from the calibrated scale of the variable frequency oscillator.

Calibration of the variable frequency oscillator is achieved in substantially the same manner except that in this case the switch S-1 is turned to include one or the other of the crystals 35, 36 in the circuit of the tube V2 and such oscillating signal, which is rich in harmonics, is impressed on the mixer tube in place of the unknown signal. Any harmonic of the individual crystals may be taken as, for example, the 10th harmonic of the 4.5 megacycle crystal. In such case if the pointer of the variable frequency oscillator does not align with the 45 megacycle mark on the scale the entire scale is shifted axially to bring about such alignment, as has been described with reference to Figure 2.

If now, the marker signal generator is to be used for the Z-axis modulation of an oscilloscope for obtaining the response curve of a TV receiver in accordance with the method outlined in the already referenced co-pending patent application switch S-2 is set to, say, the Z-axis (+) position and the signal of a sweep generator is applied to the mixer tube V1 through the terminal 33. The sweep generator signal and signal of the variable frequency oscillator result in a large number of intermodulation products. A tuned plate load coil 50, in the mixer output, selects the correct component signals which are then amplified by the right half section of the tube V2, demodulated by the designated (+) diode 51 (connected to the proper stationary contact of the deck 52 of the switch S-2), further amplified by the tube V3, clamped by the tube V4 and presented at the Z-axis terminal of the apparatus; namely, terminal 53. The polarity of such signals will be (+). Similarly, if the switch S-2 is set to the Z-axis (−) position, the reverse diode 54 is effective to demodulate the mixer output signals and the polarity of the clamped signals presented at the terminal 53 will have a minus (−) polarity. The plus (+) signals provide what is known as positive Z-axis modulation in that such marker signals provide bright spots of light on the oscilloscope wave trace whereas the negative marker signals provide negative Z-axis modulation in that spaces or holes will appear at corresponding points in the wave trace. Either type of action may be obtained by a simple rotation of the switch S-2.

In the case where the apparatus is to be used simply for the generation of a Z-axis marker signal corresponding to the frequency of the variable frequency oscillator, the mixer will generate two signals. Since the plate load coil 50 is tuned to 75 kilocycles these signals will have a frequency of 75 kilocycles above and 75 kilocycles below that of the variable oscillator. These signals are rectified by one or the other of the diodes 51, 54, clamped by the tube V4, and appear as double positive or negative pulses, respectively, at the terminal 53. This novel method of producing double marker signals is fully described in the co-pending application, Serial No. 457,014.

If, now, the crystal controlled oscillator including the left half section of the tube V2 is activated and connected into the mixer circuit, by proper setting of the switch S-1, such signal will produce side band marker signals on the variable oscillator frequency, each such side band signal being of the double marker type. Thus, if the variable oscillator is set to 100 megacycles and the selected crystal is that having a fundamental frequency of 4.5 megacycles, an additional three marker signal will be present; namely, 95.5 megacycles, 100 megacycles and 104.5 megacycles.

The additional designated postions of the gang switch S-2 are provided to increase the versatility of the apparatus. A crystal diode 55 is used to place amplitude modulation on the variable frequency oscillator output. Modulation signals of 400 cycles, 300 kilocycles and 4.5 megacycles are available. The 400 cycle modulation signal can be used for producing horizontal bars on a TV set for checking of vertical linearity whereas the 300 kilocycle modulation signal can be used for producing vertical bars for checking horizontal linearity.

From the above description of our improved marker signal generator its numerous features and advantages will be apparent to those skilled in this art. In particular, the use of the gas tube provides a simple, positive means for the visual indication of a zero beat point to the exclusion of other spurious beats. Such tube acts as a simple and effective visual calibration device offering obvious advantages over prior loudspeakers, tuning eyes, meters, etc. heretofore used for this purpose. Coupled with such functions of the gas tube the axial shifting of the calibrated scales of the variable frequency oscillator results in a simple, practical arrangement for maintaining a precise calibration of the apparatus at all times.

Having now described our invention in detail according to the requirements of the patent statutes various changes and modifications will suggest themselves to those skilled in this art, and it is intended that such changes and modifications shall fall within the scope and spirit of our invention as recited in the following claims.

We claim:

1. A marker signal generator comprising a mixer circuit capable of producing an output signal having a frequency equal to the difference frequency between two input signals, a variable frequency oscillator including a pointer cooperating with a scale marked in frequency values, a crystal controlled oscillator having a known frequency, means demodulating the mixer output signals, an amplifier responsive to the demodulated signals, a clamping circuit, a gas tube having a predetermined minimum firing voltage, circuit elements including manually operable switch operable in one position to connect the gas tube into the amplifier output and in another position to connect the clamping circuit to the amplifier output.

2. A marker signal generator comprising a mixer circuit capable of producing output signals having a frequency equal to the frequency difference between two input signals, a variable frequency oscillator having a pointer cooperating with a scale calibrated in frequency values, means impressing the signal of the variable frequency oscillator into the mixer circuit input, a crystal controlled oscillator having a known frequency, manual means operable to impress the signal of the crystal controlled oscillator into the mixer circuit input, means to impress a sweep generator signal into the mixer circuit input, means demodulating the output signals of the mixer circuit, an amplifier responsive to the demodulated signals and including a plate coil, a gas tube having a predetermined minimum firing voltage, switch means manually operable to connect the gas tube across the said plate coil, a clamping circuit, and switch means manually operable to impress the signals appearing in said plate coil into the clamping circuit.

3. The invention as recited in claim 2 including switch means manually operable to reverse the polarity of the demodulated signals.

4. A marker signal generator comprising a mixer circuit capable of producing an output signal having a frequency equal to the difference frequency between two input signals, means for demodulating the mixer output signals, an amplifier responsive to the mixer output signals, a clamping circuit, a gas tube having a predetermined minimum firing voltage, and circuit elements including a switch manually operable to one position to connect the gas tube into the amplifier output circuit and to another position to connect the clamping circuit to the amplifier output circuit.

5. The invention as recited in claim 4, wherein said amplifier has a plate coil, and said gas tube is connected across a selected portion of the plate coil when the switch is operated to the said one position.

References Cited in the file of this patent

UNITED STATES PATENTS

| | | |
|---|---|---|
| 2,307,316 | Wolff | Jan. 5, 1943 |
| 2,491,494 | Grimm | Dec. 20, 1949 |
| 2,626,980 | Balde | Jan. 27, 1953 |